(12) United States Patent
Kimura et al.

(10) Patent No.: US 10,700,990 B2
(45) Date of Patent: Jun. 30, 2020

(54) INFORMATION PROCESSING SYSTEM, INFORMATION PROCESSING APPARATUS, AND INFORMATION PROCESSING METHOD

(71) Applicant: FUJITSU LIMITED, Kawasaki-shi, Kanagawa (JP)

(72) Inventors: Kosaku Kimura, Kawasaki (JP); Atsuji Sekiguchi, Kawasaki (JP); Yusuke Sasaki, Kawasaki (JP); Masaru Ueno, Kawasaki (JP); Shridhar Choudhary, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 96 days.

(21) Appl. No.: 15/942,764

(22) Filed: Apr. 2, 2018

(65) Prior Publication Data

US 2018/0309693 A1   Oct. 25, 2018

(30) Foreign Application Priority Data

Apr. 21, 2017   (JP) ................................. 2017-084818

(51) Int. Cl.
*G06F 15/16*   (2006.01)
*H04L 12/911*   (2013.01)

(52) U.S. Cl.
CPC .................................... *H04L 47/70* (2013.01)

(58) Field of Classification Search
CPC ........ G06F 9/54; G06F 11/327; G06F 21/335; G06F 8/75; G06F 9/50; G06F 9/468; G06F 9/541; H04L 47/70; H04L 63/10; H04L 63/0281; H04L 63/0823; H04L 63/0807

See application file for complete search history.

(56) References Cited

U.S. PATENT DOCUMENTS

| | | | |
|---|---|---|---|
| 9,027,039 B2 * | 5/2015 | Michels | G06F 9/54 719/328 |
| 9,081,623 B1 * | 7/2015 | Magerramov | G06F 9/50 |
| 10,360,082 B2 * | 7/2019 | Lincoln | G06F 9/541 |
| 2003/0217188 A1 | 11/2003 | Kung et al. | |
| 2010/0269120 A1 * | 10/2010 | Manttari | G06F 9/468 719/313 |
| 2012/0144501 A1 * | 6/2012 | Vangpat | H04L 63/0807 726/28 |

(Continued)

FOREIGN PATENT DOCUMENTS

| | | |
|---|---|---|
| JP | 2005-523513 | 8/2005 |
| JP | 2008-198032 | 8/2008 |
| JP | 2015-125510 | 7/2015 |

*Primary Examiner* — Dustin Nguyen
(74) *Attorney, Agent, or Firm* — Xsensus LLP

(57) ABSTRACT

An information processing system includes a management apparatus that includes a first processor configured to store first information on an access token indicating that a right to call an application programming interface exists and second information on the application programming interface in a memory, and execute an exchange for a different access token by using the first information and the second information stored in the memory; and a client apparatus that includes a second processor configured to provide the application programming interface or use the application programming interface by utilizing the exchange for the different access token by the management apparatus.

8 Claims, 12 Drawing Sheets

(56) References Cited

U.S. PATENT DOCUMENTS

| | | | |
|---|---|---|---|
| 2014/0033278 A1* | 1/2014 | Nimashakavi | G06F 21/335 726/4 |
| 2014/0208296 A1* | 7/2014 | Dang | G06F 8/75 717/123 |
| 2015/0180863 A1* | 6/2015 | Kobayashi | H04L 47/70 726/9 |
| 2015/0193600 A1* | 7/2015 | Matsuda | H04L 63/0823 726/9 |
| 2015/0220376 A1* | 8/2015 | Srivastava | G06F 11/327 714/37 |
| 2017/0006021 A1* | 1/2017 | Karaatanassov | H04L 63/0281 |
| 2017/0099292 A1* | 4/2017 | Kelley | H04L 63/10 |

* cited by examiner

FIG. 2

| ID | API | CALL CAPABILITY | NOTES |
|---|---|---|---|
| $ | http://standard.com/api/ | 1 | BASIC API |
| api_1 | http://hoge.com/api/ | 2 | API PROVIDED BY hoge |
| api_2 | http://fuga.com/api/ | 3 | API PROVIDED BY fuga |

FIG. 3

| OWNER | $ | api_1 | api_2 |
|---|---|---|---|
| hoge | 0 | 100 | 0 |
| fuga | 0 | 0 | 100 |
| piyo | 20 | 0 | 0 |

FIG. 4A

ACCESS TOKEN EXCHANGE
TRACK RECORD OF hoge

| ID | THE NUMBER OF TIMES OF EXCHANGE |
|---|---|
| api_2 | 5 |

| OWNER | THE NUMBER OF TIMES OF EXCHANGE |
|---|---|
| fuga | 0 |
| piyo | 0 |

FIG. 4B

ACCESS TOKEN EXCHANGE
TRACK RECORD OF fuga

| ID | THE NUMBER OF TIMES OF EXCHANGE |
|---|---|
| api_1 | 2 |

| OWNER | THE NUMBER OF TIMES OF EXCHANGE |
|---|---|
| hoge | 3 |
| piyo | 0 |

FIG. 4C

ACCESS TOKEN EXCHANGE
TRACK RECORD OF piyo

| ID | THE NUMBER OF TIMES OF EXCHANGE |
|---|---|
| api_1 | 3 |
| api_2 | 4 |

| OWNER | THE NUMBER OF TIMES OF EXCHANGE |
|---|---|
| hoge | 0 |
| fuga | 0 |

EXCHANGE SOURCE ACCESS TOKEN

OWNER

FIG. 5A

| OWNER | $ | api_1 | api_2 |
|---|---|---|---|
| hoge | 2 | 99 | 0 |
| fuga | 0 | 0 | 100 |
| piyo | 18 | 1 | 0 |

FIG. 5B

| OWNER | $ | api_1 | api_2 |
|---|---|---|---|
| hoge | 2 | 100 | 0 |
| fuga | 0 | 0 | 100 |
| piyo | 18 | 0 | 0 |

FIG. 5C

| OWNER | $ | api_1 | api_2 |
|---|---|---|---|
| hoge | 1 | 99 | 1 |
| fuga | 1 | 1 | 99 |
| piyo | 18 | 0 | 0 |

FIG. 5D

| OWNER | $ | api_1 | api_2 |
|---|---|---|---|
| hoge | 1 | 99 | 0 |
| fuga | 1 | 1 | 100 |
| piyo | 18 | 0 | 0 |

FIG. 5E

| OWNER | $ | api_1 | api_2 |
|---|---|---|---|
| hoge | 1 | 99 | 0 |
| fuga | 0 | 1 | 100 |
| piyo | 18 | 0 | 0 |

INFORMATION PROCESSING SYSTEM, INFORMATION PROCESSING APPARATUS, AND INFORMATION PROCESSING METHOD

CROSS-REFERENCE TO RELATED APPLICATION

This application is based upon and claims the benefit of priority of the prior Japanese Patent Application No. 2017-84818, filed on Apr. 21, 2017, the entire contents of which are incorporated herein by reference.

FIELD

The embodiment discussed herein is related to an information processing system, an information processing apparatus, and an information processing method.

BACKGROUND

In the case of using resources such as data, storage, central processing unit (CPU), and software that exist in a server, the user calls a Web application programming interface (Web API) from a program. However, in the case of calling the Web API, an access token indicating that the user has a right to call the Web API is desired and the user is desired to pay a usage fee to acquire the access token.

There is a technique that gives a single point of a gateway for storing and retrieving and changing option value in various operating systems. Furthermore, there is a technique that implements a right transfer system with which convenience of services is improved without being affected by the API use situation of other services by executing API count processing to manage the upper limit number of times of API use regarding each client in accordance with the upper limit number of times of use regarding each API set as the right transfer destination.

There is a technique in which a right-to-use transaction server makes a transaction of only a token authenticated by a right-to-use management server with user terminals and, in the transaction, the right-to-use transaction server serves as a transfer destination that temporarily receives a transfer for the transfer source user terminal of the token and serves as a transfer source for the transfer destination user terminal of the token. According to this technique, protection of the right of the valid token holder and token transactions with high safety are enabled without mutual sharing of privacy information and individual information of each of users. As related arts of the above-described techniques, Japanese National Publication of International Patent Application No. 2005-523513, Japanese Laid-open Patent Publication No. 2015-125510, Japanese Laid-open Patent Publication No. 2008-198032, and so forth are disclosed, for example.

A user of a Web API may acquire an access token by paying a usage fee. However, the access tokens of different Web APIs do not have compatibility and it is difficult to exchange different access tokens.

For example, when certain non-free Web API #1 is called to utilize resources and new Web API #2 is provided for a fee, an access token of Web API #1 is purchased through selling of an access token of Web API #2.

Therefore, use of the Web API involves a problem that convenience when a Web API is used is poor. In view of the above, it is desirable that the convenience when a Web API is used may be improved.

SUMMARY

According to an aspect of the embodiment, an information processing system includes a management apparatus that includes a first processor configured to store first information on an access token indicating that a right to call an application programming interface exists and second information on the application programming interface in a memory, and execute an exchange for a different access token by using the first information and the second information stored in the memory; and a client apparatus that includes a second processor configured to provide the application programming interface or use the application programming interface by utilizing the exchange for the different access token by the management apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating one example of an API management table;

FIG. 3 is a diagram illustrating one example of an access token management table;

FIG. 4A, FIG. 4B, and FIG. 4C are diagrams illustrating examples of an access token exchange track record;

FIG. 5A, FIG. 5B, FIG. 5C, FIG. 5D, and FIG. 5E are diagrams illustrating a transition example of an access token management table;

DESCRIPTION OF EMBODIMENT

An embodiment of an information processing system and an information processing apparatus and API control method and program disclosed by the present application will be described in detail below based on the drawings. In the following description, the Web API will be represented simply as API. The present embodiment does not limit techniques of the disclosure.

[Embodiment]

Figure 1:
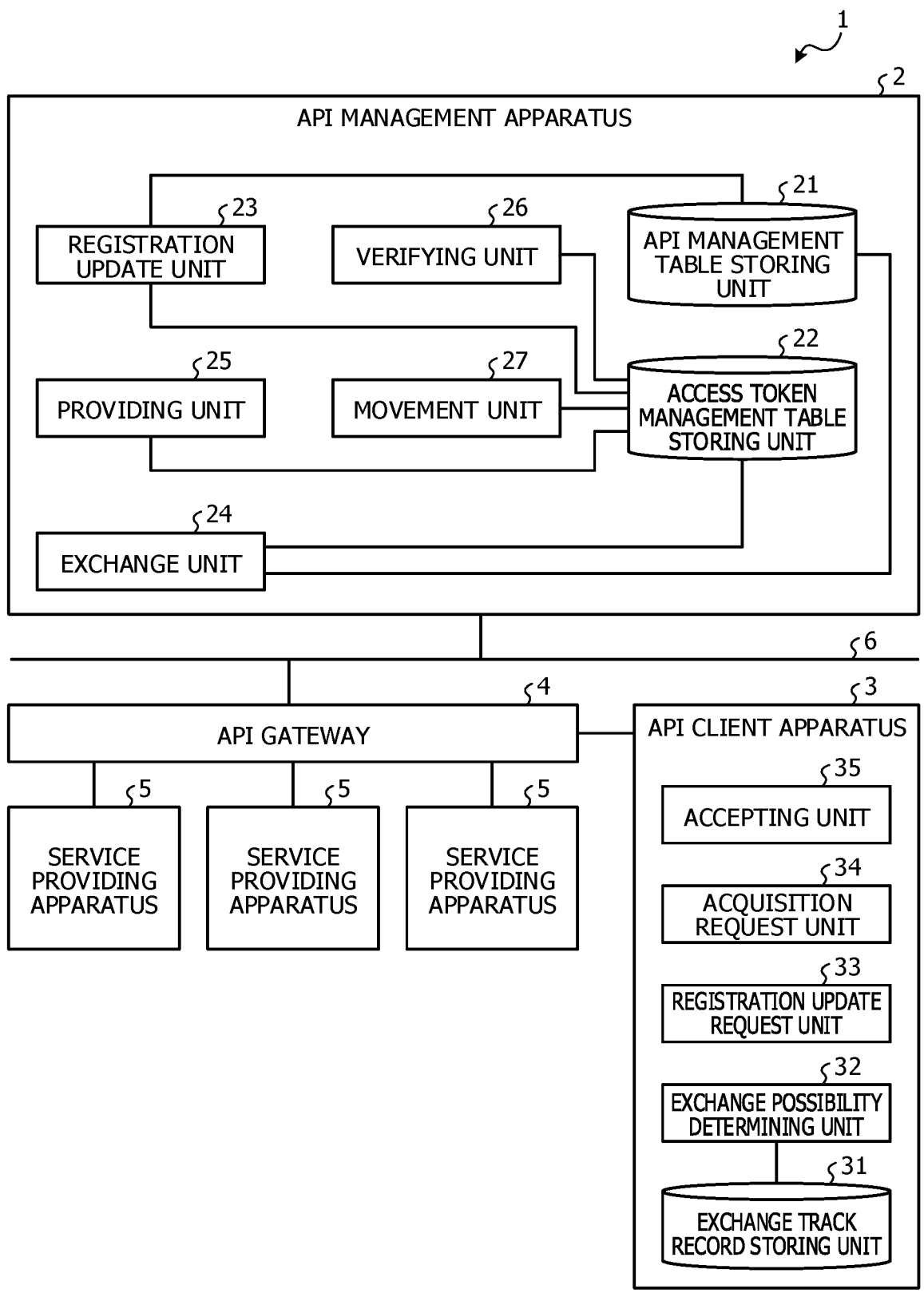
FIG. 1 is a diagram illustrating a configuration of an API management system according to an embodiment.

First, the configuration of an API management system according to the embodiment will be described. FIG. 1 is a diagram illustrating a configuration of an API management system according to the embodiment. As illustrated in FIG. 1, an API management system 1 according to the embodiment includes an API management apparatus 2, an API client apparatus 3, an API gateway 4, and three service providing apparatuses 5.

The API management apparatus 2 and the API gateway 4 are coupled by a network 6. The API client apparatus 3 and each service providing apparatus 5 are coupled to the network 6 through the API gateway 4.

Although only one API gateway 4 and one API client apparatus 3 are illustrated here for convenience of explanation, the API management system 1 includes plural API gateways 4 and plural API client apparatuses 3. The number of service providing apparatuses 5 may be smaller than three or may be equal to or larger than four.

The API management apparatus 2 is an apparatus that carries out unified management of information relating to the API. The API client apparatus 3 is an apparatus used for provision of an API and use of an API. The API client apparatus 3 may be used only for provision of an API or use of an API.

The API gateway 4 is a gateway that couples the API client apparatus 3 and the three service providing apparatuses 5 to the network 6. The API management system 1 may include a reverse proxy or Web server instead of the API gateway 4.

The service providing apparatus 5 is an apparatus that provides resources. A user of the resources uses the resources provided by the service providing apparatus 5 by presenting an access token and calling an API. The access token is implemented by using JavaScript (registered trademark) Object Notation (JSON), Web Token, Blockchain, or the like.

The API management apparatus 2 includes an API management table storing unit 21, an access token management table storing unit 22, a registration update unit 23, an exchange unit 24, a providing unit 25, a verifying unit 26, and a movement unit 27.

The API management table storing unit 21 stores an API management table for managing information relating to the API. FIG. 2 is a diagram illustrating one example of an API management table. As illustrated in FIG. 2, ID, API, and call capability are included in the API management table. The ID is an identifier for identifying the API. The API is a programming interface called at the time of use of resources.

The call capability is the number of times a basic API may be called. Here, the basic API is an API that may be accessed with a basic access token. The basic access token is an access token that serves as the basis among access tokens. For example, the basic API is an API that transmits one dollar to a designated account by using a bank API when being called one time. The API user may acquire the basic access token from the API management apparatus 2. The identifier of the basic API is "$."

The API provider registers, in the API management apparatus 2, the number of times the basic API may be called per one access token of a provided API. The API management apparatus 2 manages the number of times registered by the API provider as the call capability of the API management table.

For example, an API "http://hoge.com/api/" identified with "api_1" has value that allows the basic API to be called "2" times. The column of notes is a column for explanation and is not included in the API management table.

The access token management table storing unit 22 stores an access token management table for managing information relating to the access token. FIG. 3 is a diagram illustrating one example of an access token management table. As illustrated in FIG. 3, in the access token management table, the number of owned access tokens is registered in association with the identifier of the owner regarding each owner. For example, an owner identified with "hoge" owns "100" access tokens of "api_1."

The API provider registers the number of access tokens that may be provided in the API management apparatus 2. The API management apparatus 2 manages the number registered by the API provider by using the access token management table. The API user exchanges access tokens with the provider of the API desired to be used through the API management apparatus 2 by using the API client apparatus 3 in such a manner that the call capabilities become substantially equal. For example, the call capability of "api_1" is "2" and the call capability of "api_2" is "3." Thus, three access tokens of "api_1" are exchanged for two access tokens of "api_2."

The API user specifies the access token of the API desired to be used and calls the API. It is also possible for the API user to exchange access tokens simultaneously with the API call. When the API user specifies the access token owned by the API user for the API call, an exchange with the access token of the API to be called is automatically carried out. The access token specified at the time of the API call comes to be owned by the API provider.

For the exchange of access tokens, approval by the API provider requested to exchange the access tokens is desired. However, an exchange for the basic access token is approved without conditions. In the exchange of access tokens, approval is automatically carried out if the exchange track record of the exchange source access token and the exchange track record of the owner of the exchange source access token satisfy a given condition. On the other hand, approval by the API provider is desired if the given condition is not satisfied.

Referring back to FIG. 1, the registration update unit 23 carries out registration of information relating to an API in the API management table and update of the API management table based on an instruction by an API provider. Furthermore, the registration update unit 23 carries out registration of information relating to an access token in the access token management table and update of the access token management table.

The exchange unit 24 carries out an exchange of access tokens. The exchange unit 24 exchanges access tokens in such a manner that call capabilities become substantially equal. The exchange unit 24 inquires of the API client apparatus 3 of an API provider whether or not an exchange is possible. Then, when receiving a response indicating that the exchange is possible, the exchange unit 24 exchanges access tokens. When exchanging access tokens, the exchange unit 24 updates the access token management table. Then, the exchange unit 24 instructs the API client apparatus 3 of the exchange destination to update the exchange track record to be described later.

The providing unit 25 provides the basic access token to an API user. The providing unit 25 determines whether or not the API user has a qualification to acquire the basic access token based on a measure provided by the basic API provider. Then, the providing unit 25 updates the access token management table if determining that the API user has the qualification to acquire the basic access token. Then, the providing unit 25 notifies success in acquisition to the API client apparatus 3 of the API user.

The verifying unit 26 verifies whether or not use of an access token is correct with reference to the access token management table based on a request from an API provider.

Then, the verifying unit 26 notifies the verification result to the API client apparatus 3 of the API provider.

The movement unit 27 carries out movement of an access token from an API user to an API provider based on a request from the API provider. For example, the movement unit 27 decreases the number of owned access tokens corresponding to the API user and the movement-target API in the access token management table by one. Then, the movement unit 27 increases the number of owned access tokens corresponding to the API provider and the movement-target API in the access token management table by one.

The API client apparatus 3 includes an exchange track record storing unit 31, an exchange possibility determining unit 32, a registration update request unit 33, an acquisition request unit 34, and an accepting unit 35.

The exchange track record storing unit 31 stores information relating to the exchange track records of access tokens. FIG. 4 is a diagram illustrating an example of access token exchange track records. As illustrated in FIG. 4, as the access token exchange track records, there are the exchange track record relating to the exchange source access token and the exchange track record relating to the owner of the exchange source access token.

The exchange track record relating to the exchange source access token is information in which the ID of the API of the exchange source access token is associated with the number of times of exchange, and is the number of times the exchange source access token has been exchanged. The exchange track record relating to the owner is information in which the owner of the exchange source access token is associated with the number of times of exchange, and is the number of times an exchange of access tokens has been carried out with the owner of the exchange source access token. The exchange track record storing unit 31 does not store the track record of exchange between the basic access token and the access token of the API provided by the API provider.

FIG. 4A represents the access token exchange track record of "hoge." FIG. 4B represents the access token exchange track record of "fuga." FIG. 4C represents the access token exchange track record of "piyo." For example, "hoge" has a track record of having carried out an exchange for the access token of "api_2" five times and does not have a track record of having carried out an exchange with "fuga" and "piyo."

The exchange possibility determining unit 32 refers to the access token exchange track record and determines whether or not access token exchange is possible. The exchange possibility determining unit 32 sets the threshold of the number of times of exchange to "3," for example, and determines that the access token exchange is possible if the number of times of exchange of the exchange source access token is equal to or larger than the threshold or if the number of times of exchange of access tokens with the owner is equal to or larger than the threshold.

The registration update request unit 33 requests the API management apparatus 2 to register and update the information relating to the API and the access token based on an instruction by the API provider. For example, the registration update request unit 33 requests the API management apparatus 2 to register and update the API, the ID of the API, the call capability of the API, the number of owned access tokens, and so forth.

The acquisition request unit 34 requests the API management apparatus 2 to acquire the basic access token. The acquisition request unit 34 specifies the identifier of the API user, the requested number of basic access tokens, and qualification information of the API user and requests the acquisition of the basic access token.

The accepting unit 35 accepts an API call by an API user. If the access token is correctly specified, the accepting unit 35 processes the API call and moves the access token from the API user to the API provider to respond to the API call source. If an access token different from the access token of the API is specified, the accepting unit 35 requests the API management apparatus 2 to exchange the access tokens. Then, if the exchange succeeds, the accepting unit 35 processes the API call and moves the access token from the API user to the API provider to respond to the API call source.

Next, a transition example of the access token management table will be described. FIG. 5A, FIG. 5B, FIG. 5C, FIG. 5D, and FIG. 5E are diagrams illustrating a transition example of an access token management table. FIG. 5A represents the state in which "piyo" has exchanged the basic access token for the access token of "api_1" owned by "hoge" in the state represented in FIG. 3.

The call capability of "api_1" is "2." Thus, the number of basic access tokens owned by "piyo" decreases by "2" from "20" to "18" and the number of basic access tokens owned by "hoge" increases by "2" from "0" to "2." Furthermore, the number of access tokens of "api_1" owned by "hoge" decreases by "1" from "100" to "99" and the number of access tokens of "api_1" owned by "piyo" increases by "1" from "0" to "1."

FIG. 5B represents the state immediately after "piyo" has called "api_1." The number of access tokens of "api_1" owned by "piyo" decreases by "1" from "1" to "0" and the number of access tokens of "api_1" owned by "hoge" increases by "1" from "99" to "100."

FIG. 5C represents the state immediately after "hoge" has exchanged the basic access token and the access token of "api_1" for the access token of "api_2." The number of basic access tokens owned by "hoge" decreases by "1" from "2" to "1," and the number of access tokens of "api_1" decreases by "1" from "100" to "99," and the number of access tokens of "api_2" increases by "1" from "0" to "1." Furthermore, the number of basic access tokens owned by "fuga" increases by "1" from "0" to "1," and the number of access tokens of "api_1" increases by "1" from "0" to "1," and the number of access tokens of "api_2" decreases by "1" from "100" to "99."

FIG. 5D represents the state immediately after "hoge" has called "api_2." The number of access tokens of "api_2" owned by "hoge" decreases by "1" from "1" to "0" and the number of access tokens of "api_2" owned by "fuga" increases by "1" from "99" to "100."

FIG. 5E represents the state immediately after "fuga" has called the basic API. The number of basic access tokens owned by "fuga" decreases by "1" from "1" to "0." The basic access token is returned to the provider of the basic API.

Figure 6:
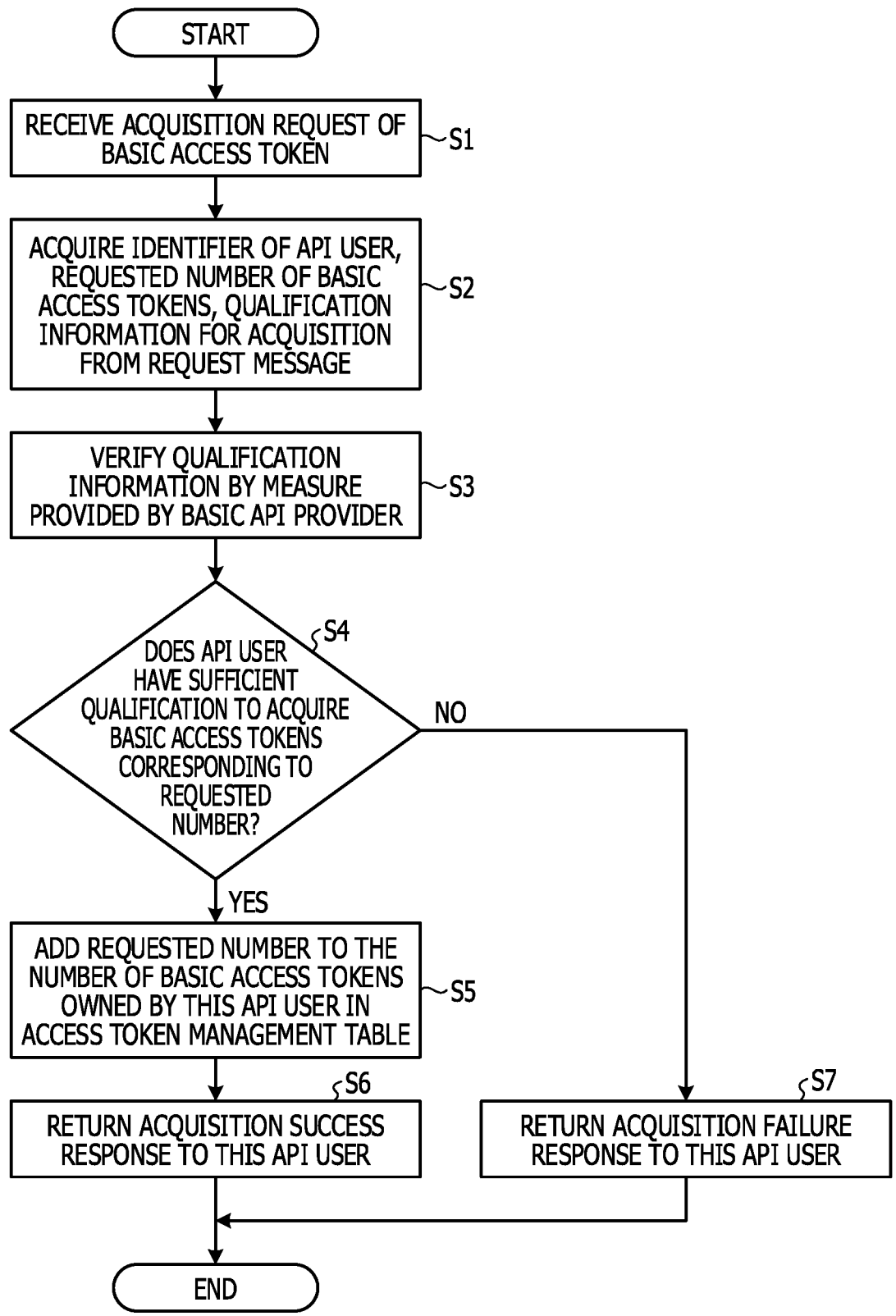
FIG. 6 is a flowchart illustrating a flow of processing of providing a basic access token.

Next, the flows of processing by the API management apparatus 2 will be described by using FIG. 6 to FIG. 8. FIG. 6 is a flowchart illustrating a flow of processing of providing a basic access token. As represented in FIG. 6, the providing unit 25 receives an acquisition request of the basic access token (S1). Then, the providing unit 25 acquires the identifier of the API user, the requested number of basic access tokens, and qualification information for the acquisition from the request message (S2).

Then, the providing unit 25 verifies the qualification information by a measure provided by the basic API provider (S3). Then, the providing unit 25 determines whether or not the API user has a sufficient qualification to acquire the basic access tokens corresponding to the requested number (S4).

Then, if the API user has the qualification, the providing unit 25 adds the requested number to the number of basic access tokens owned by this API user in the access token management table (S5) and returns an acquisition success response to this API user (S6). On the other hand, if the API user does not have the qualification, the providing unit 25 returns an acquisition failure response to this API user (S7).

In this manner, the providing unit 25 updates the number of owned basic access tokens in the access token management table if the API user has the qualification to acquire the basic access token. This allows the API user to call an API by using the basic access token.

Figure 7A:
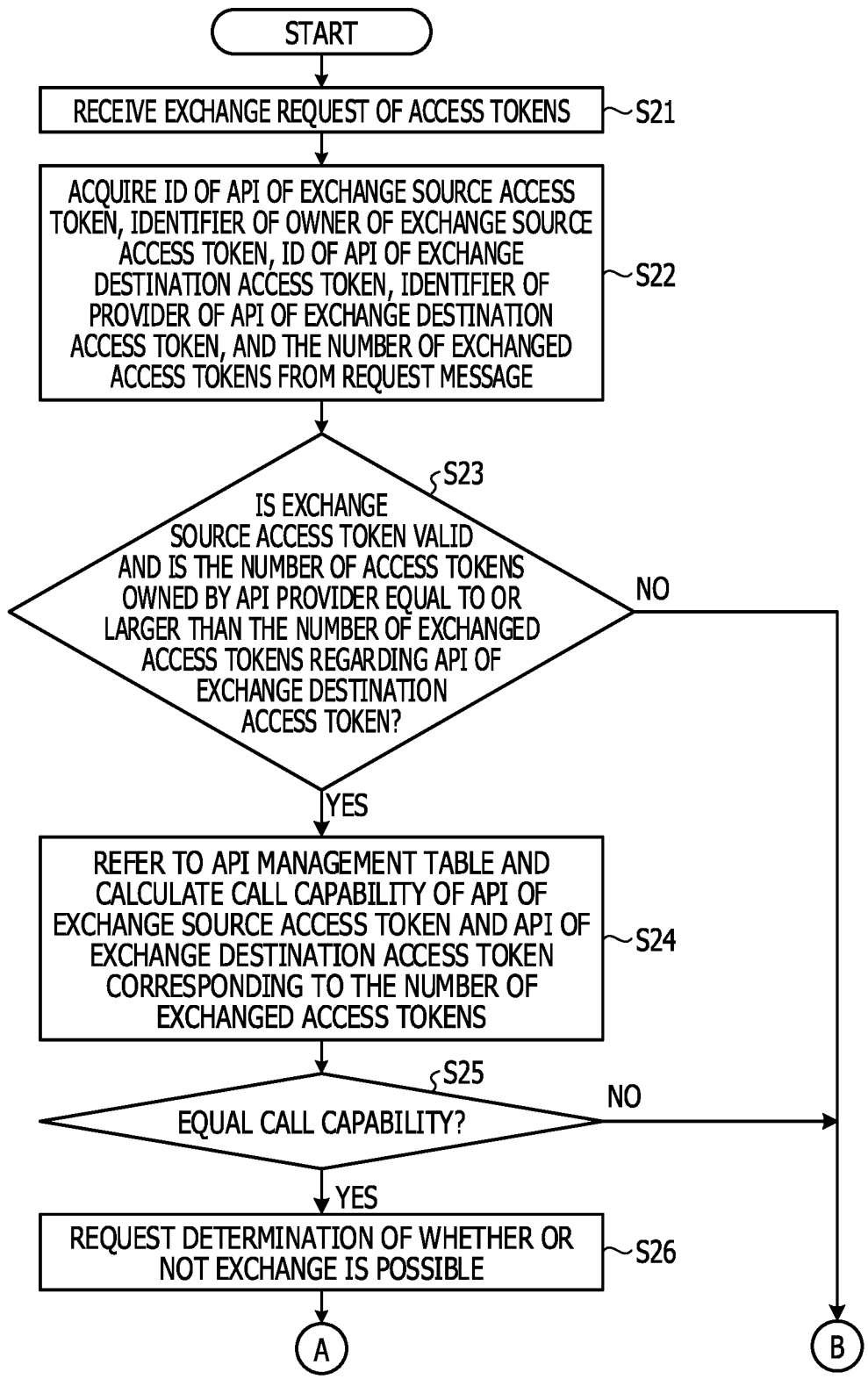
FIGS. 7A and 7B are flowcharts illustrating a flow of processing of exchanging access tokens.
Figure 7B:
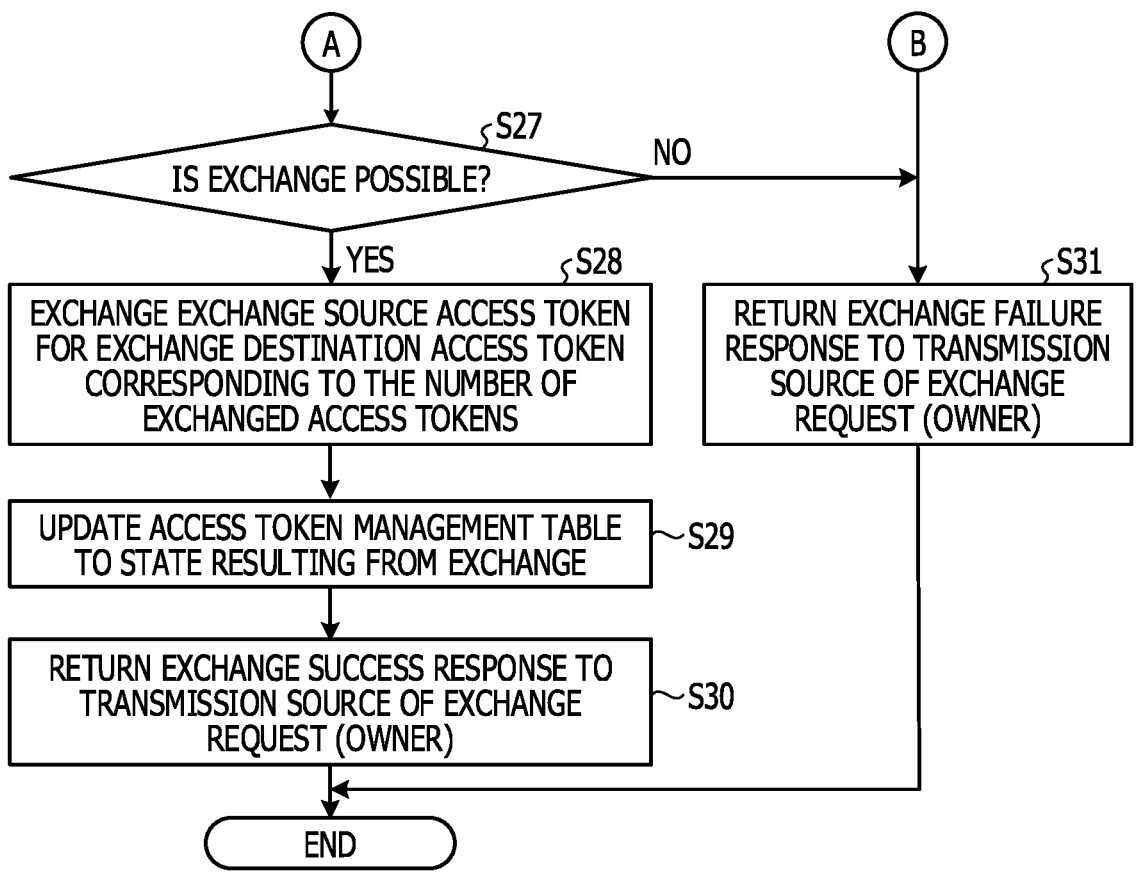

FIGS. 7A and 7B are flowcharts illustrating a flow of processing of exchanging access tokens. As represented in FIG. 7A, the exchange unit 24 receives an exchange request of access tokens (S21). Then, the exchange unit 24 acquires the ID of the API of the exchange source access token, the identifier of the owner of the exchange source access token, the ID of the API of the exchange destination access token, the identifier of the provider of the API of the exchange destination access token, and the number of exchanged access tokens from the request message (S22). Plural pairs may exist as the pair of the ID of the API of the exchange source access token and the identifier of the owner of the exchange source access token.

Then, the exchange unit 24 determines whether or not the exchange source access token is valid and the number of access tokens owned by the API provider is equal to or larger than the number of exchanged access tokens regarding the API of the exchange destination access token (S23). Then, if the determination result of S23 is Yes, the exchange unit 24 refers to the API management table and calculates the call capability of the API of the exchange source access token and the API of the exchange destination access token corresponding to the number of exchanged access tokens (S24).

Then, the exchange unit 24 determines whether or not the exchange source and the exchange destination have substantially equal call capability (S25). Then, if the exchange source and the exchange destination have substantially equal call capability, the exchange unit 24 requests the API client apparatus 3 of the API provider to determine whether or not the exchange is possible (S26). Then, as represented in FIG. 7B, the exchange unit 24 determines whether or not a response from the API client apparatus 3 of the API provider indicates that the exchange is possible (S27).

Then, if the exchange is possible, the exchange unit 24 exchanges the exchange source access token for the exchange destination access token corresponding to the number of exchanged access tokens (S28). Then, the exchange unit 24 updates the access token management table to the state resulting from the exchange (S29). Then, the exchange unit 24 returns an exchange success response to the transmission source of the exchange request, i.e. the owner of the exchange destination access token (S30). When receiving the exchange success response, the transmission source of the exchange request updates the access token exchange track record.

On the other hand, if determining that the exchange is not possible in S27 or if determining that the exchange source and the exchange destination do not have substantially equal call capability in S25, the exchange unit 24 returns an exchange failure response to the transmission source of the exchange request (S31). Also when the determination result of S23 is No, the exchange unit 24 returns an exchange failure response to the transmission source of the exchange request (S31).

In this manner, the exchange unit 24 exchanges access tokens having substantially equal call capability. Due to this, even if an API user does not have the access token for calling an API, the API user may use this API by using another access token.

Figure 8:
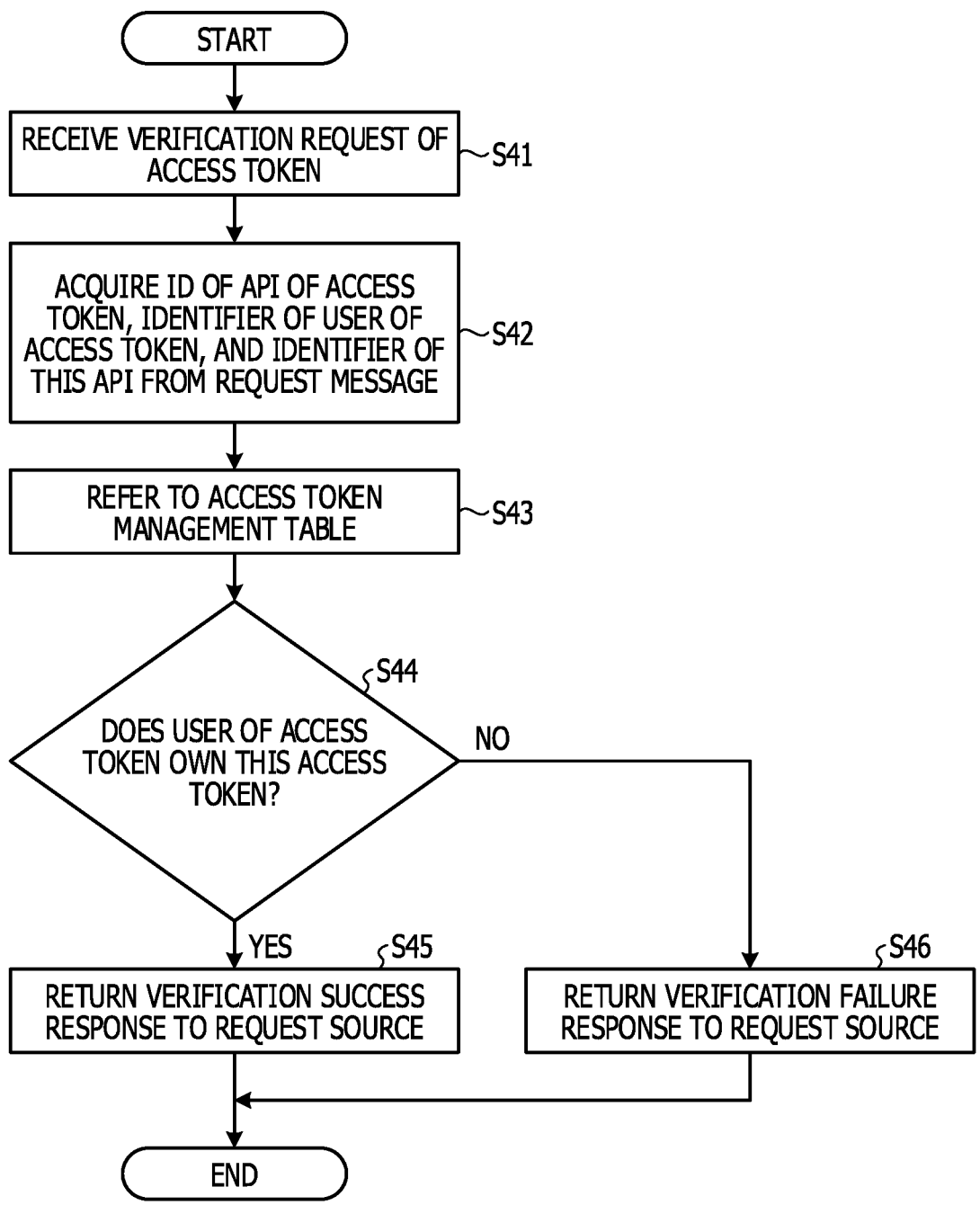
FIG. 8 is a flowchart illustrating a flow of processing of verifying an access token.

FIG. 8 is a flowchart illustrating a flow of processing of verifying an access token. As represented in FIG. 8, the verifying unit 26 receives a verification request of an access token (S41). Then, the verifying unit 26 acquires the ID of the API of the access token and the identifier of the user of the access token from the request message (S42).

Then, the verifying unit 26 refers to the access token management table (S43) and determines whether or not the user of the access token owns this access token (S44). Then, if the user of the access token owns this access token, the verifying unit 26 returns a verification success response to the request source (S45). On the other hand, if the user of the access token does not own this access token, the verifying unit 26 returns a verification failure response to the request source (S46).

In this manner, the verifying unit 26 verifies whether the user of an access token owns the access token by using the access token management table. This allows the API management system 1 to suppress fraudulent use of the access token.

Figure 9:
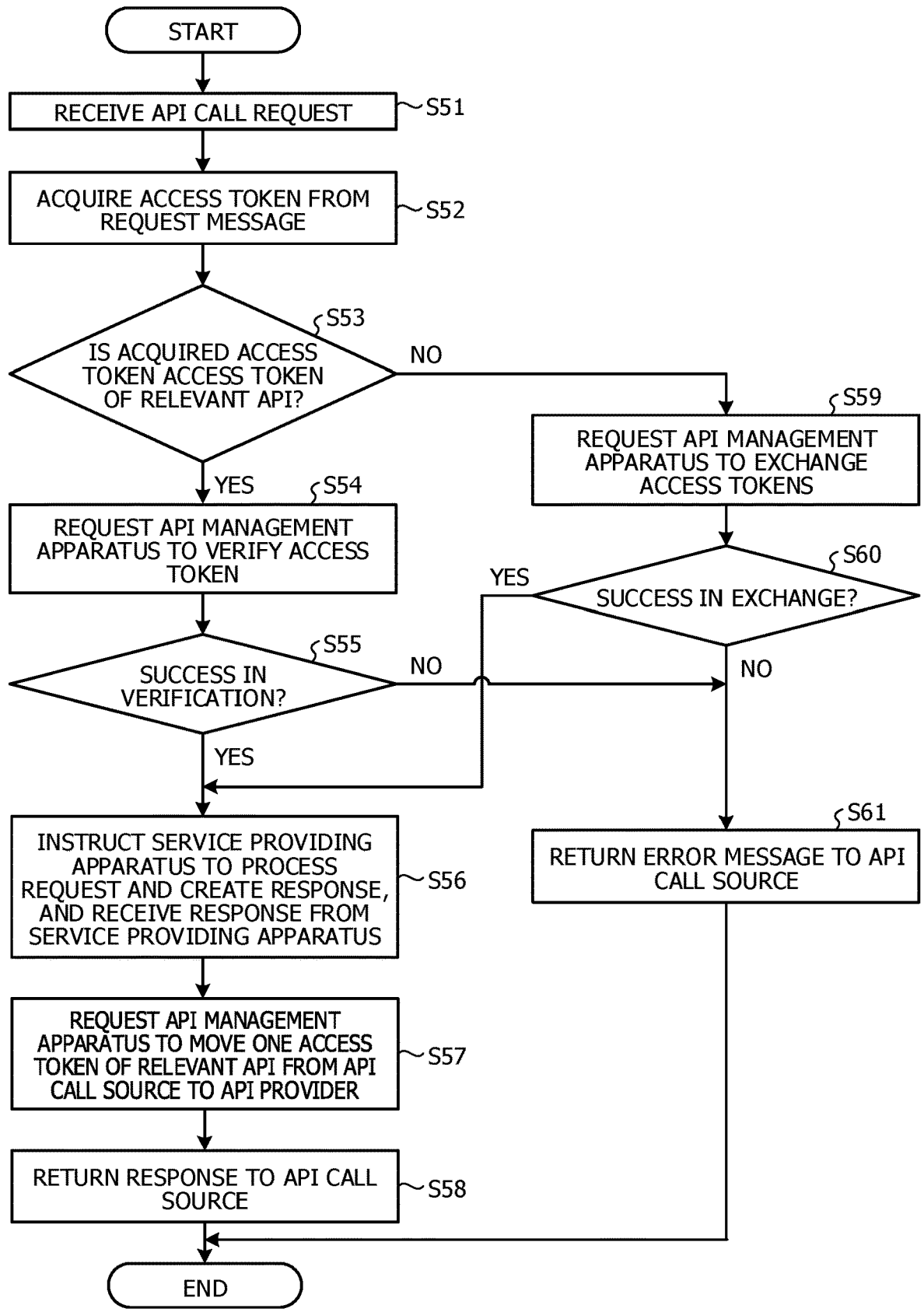
FIG. 9 is a flowchart illustrating a flow of acceptance processing of an API call.

Next, the flow of processing by the API client apparatus 3 will be described by using FIG. 9 and FIG. 10. FIG. 9 is a flowchart illustrating a flow of acceptance processing of an API call. As represented in FIG. 9, the accepting unit 35 receives an API call request (S51) and acquires an access token from the request message (S52).

Then, the accepting unit 35 determines whether or not the acquired access token is the access token of the relevant API (S53). If the acquired access token is the access token of the relevant API, the accepting unit 35 requests the API management apparatus 2 to verify the access token (S54). Then, the accepting unit 35 determines whether or not the verification has succeeded (S55). If the verification has succeeded, the accepting unit 35 instructs the service providing apparatus 5 to process the request and create a response, and receives the response from the service providing apparatus 5 (S56).

Then, the accepting unit 35 requests the API management apparatus 2 to move one access token of the relevant API from the API call source to the API provider (S57). Then, the accepting unit 35 returns the response to the API call source (S58).

If the verification has not succeeded in S55, the accepting unit 35 returns an error message to the API call source (S61). If the extracted access token is not the access token of the relevant API in S53, the accepting unit 35 requests the API management apparatus 2 to exchange access tokens (S59). Then, the accepting unit 35 determines whether or not the exchange has succeeded (S60). If the exchange has succeeded, the accepting unit 35 moves to S56. If the exchange has not succeeded, the accepting unit 35 moves to S61.

In this manner, the accepting unit 35 requests the API management apparatus 2 to exchange access tokens. Due to this, even if an API user does not have the access token for calling an API, the API user may use this API by using another access token.

Figure 10:
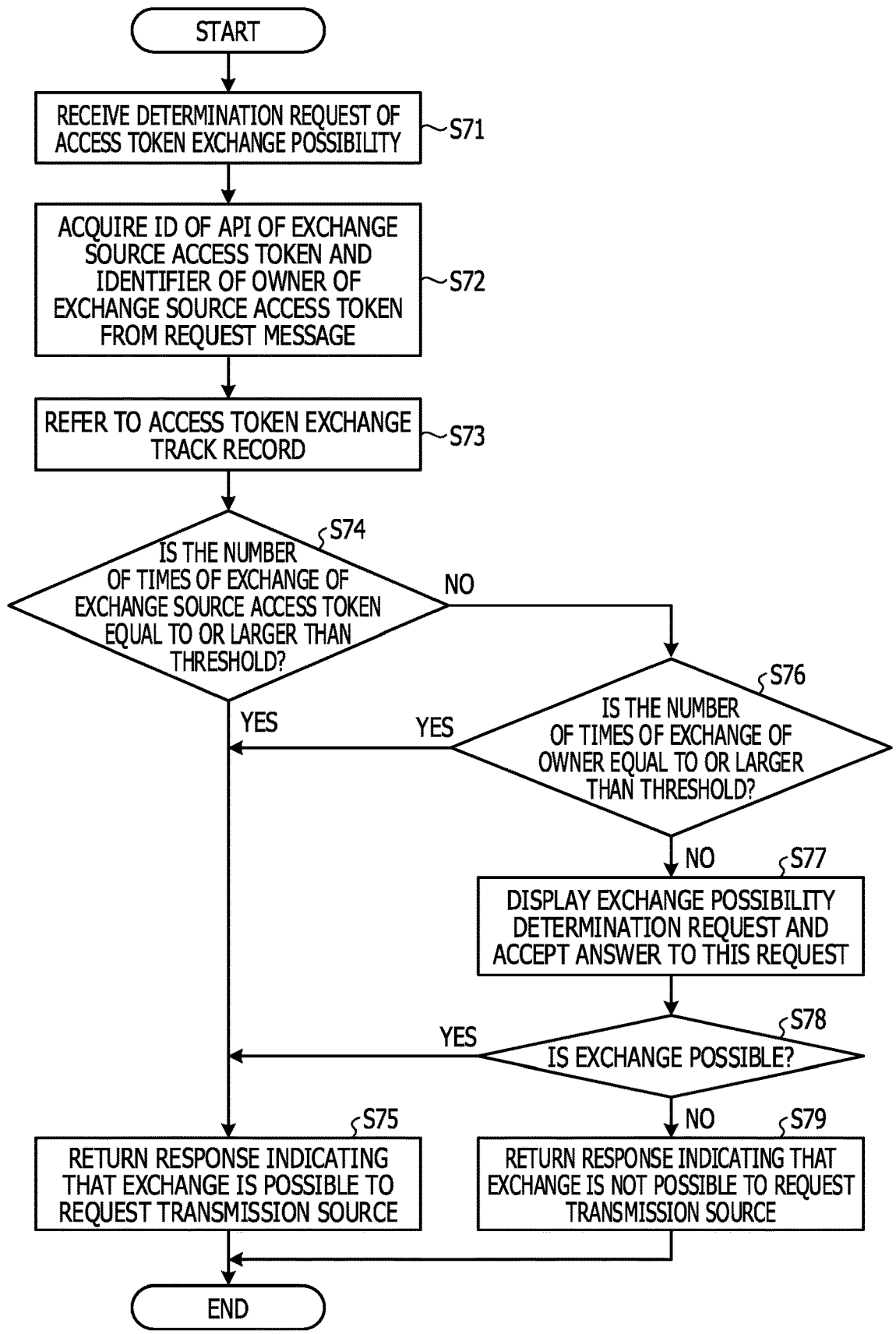
FIG. 10 is a flowchart illustrating a flow of processing of determining whether or not an exchange of access tokens is possible.

FIG. 10 is a flowchart illustrating a flow of processing of determining whether or not an exchange of access tokens is possible. As represented in FIG. 10, the exchange possibility determining unit 32 receives a determination request of access token exchange possibility (S71). Then, the exchange possibility determining unit 32 acquires the ID of the API of the exchange source access token and the identifier of the owner of the exchange source access token from the request message (S72).

Then, the exchange possibility determining unit 32 refers to the access token exchange track record (S73) and determines whether or not the number of times of exchange of the exchange source access token is equal to or larger than a threshold (S74). Then, if the number of times of exchange of the exchange source access token is equal to or larger than the threshold, the exchange possibility determining unit 32 returns a response indicating that the exchange is possible to the determination request transmission source (S75).

On the other hand, if the number of times of exchange of the exchange source access token is not equal to or larger than the threshold, the exchange possibility determining unit 32 determines whether or not the number of times of exchange of the owner of the exchange source access token is equal to or larger than a threshold (S76). Then, if the number of times of exchange of the owner of the exchange source access token is equal to or larger than the threshold, the exchange possibility determining unit 32 returns a response indicating that the exchange is possible to the determination request transmission source (S75).

On the other hand, if the number of times of exchange of the owner of the exchange source access token is not equal to or larger than the threshold, the exchange possibility determining unit 32 displays an exchange possibility determination request on a display apparatus and accepts an answer to this request (S77). Then, the exchange possibility determining unit 32 determines whether or not the accepted answer indicates that the exchange is possible (S78). If the exchange is possible, the exchange possibility determining unit 32 returns a response indicating that the exchange is possible to the determination request transmission source (S75). On the other hand, if the exchange is not possible, the exchange possibility determining unit 32 returns a response indicating that the exchange is not possible to the determination request transmission source (S79).

In this manner, the exchange possibility determining unit 32 determines whether or not an exchange of access tokens is possible based on the access token exchange track record. This allows the API management system 1 to carry out access token exchange with high reliability.

As described above, in the embodiment, the API management apparatus 2 manages information relating to the API by using the API management table storing unit 21 and manages information relating to the access token by using the access token management table storing unit 22. Furthermore, the exchange unit 24 exchanges access tokens of different APIs by using the API management table storing unit 21 and the access token management table storing unit 22. Moreover, the API client apparatus 3 carries out at least provision of an API or use of an API by utilizing exchange for a different access token by the API management apparatus 2. Therefore, the API management system 1 may improve convenience of the API use. For example, the API management system 1 carries out control for promoting use of the API to support the user of the API.

In the embodiment, when receiving an API call, the accepting unit 35 of the API client apparatus 3 determines whether or not the access token included in the API call is the access token of the relevant API. Then, if the access token included in the API call is the access token of the relevant API, the accepting unit 35 requests the API management apparatus 2 to verify the access token. Then, the verifying unit 26 of the API management apparatus 2 verifies whether the access token is correctly used. Therefore, the API management system 1 may improve the reliability of the API use. For example, the API management system 1 carries out control for verifying the use of the API to support the user of the API.

In the embodiment, if the access token included in an API call is not the access token of the called API, the accepting unit 35 requests the API management apparatus 2 to exchange access tokens. Then, based on the request by the API client apparatus 3, the exchange unit 24 of the API management apparatus 2 determines whether or not the call capability of the API of the access token included in the API call are the call capability of the called API are substantially equal, and exchanges the access tokens if both are substantially equal. Therefore, the API management system 1 may improve convenience of the API provision. For example, the API management system 1 carries out control for promoting provision of the API to support the provider of the API.

In the embodiment, in the case of exchanging access tokens, the API management apparatus 2 requests the API client apparatus 3 that provides the API of the access token of the exchange destination to determine whether or not the exchange is possible. Then, the API client apparatus 3 requested to determine whether or not the exchange is possible determines whether or not the exchange is possible based on the access token of the exchange source and the exchange track record of the owner of the access token of the exchange source. Therefore, the API management system 1 may carry out access token exchange with high reliability.

In the embodiment, the API management apparatus 2 provides the basic access token to the API client apparatus 3 and the API client apparatus 3 may use an API by using the basic access token. Therefore, the API management system 1 may improve convenience of the API use.

In the embodiment, description is made about the API management apparatus 2. However, by implementing the configuration possessed by the API management apparatus 2 by software, an API management program having similar functions may be obtained. Similarly, by implementing the configuration possessed by the API client apparatus 3 by software, an API client program having similar functions may be obtained. Thus, description will be made about a computer that executes the API management program. The API client program is also executed by similar computer.

Figure 11:
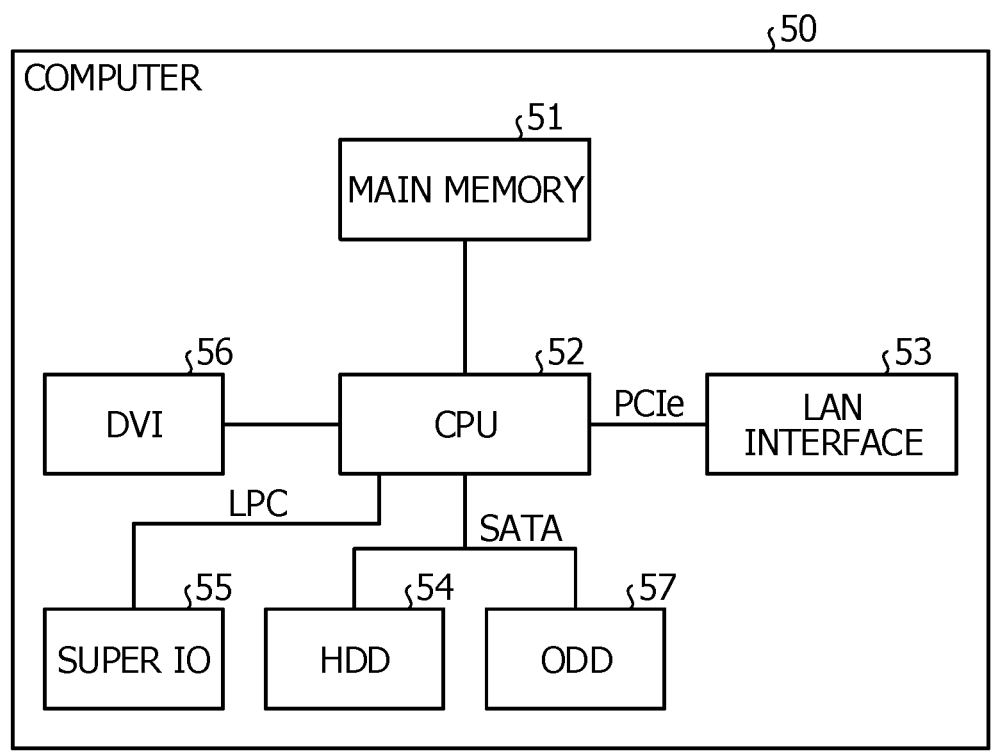
FIG. 11 is a diagram illustrating a hardware configuration of a computer that executes an API management program according to an embodiment.

FIG. 11 is a diagram illustrating a hardware configuration of a computer that executes an API management program according to the embodiment. As illustrated in FIG. 11, a computer 50 includes a main memory 51, a CPU 52, a local area network (LAN) interface 53, and a hard disk drive (HDD) 54. The computer 50 includes a super input output (IO) 55, a digital visual interface (DVI) 56, and an optical disk drive (ODD) 57.

The main memory 51 is a memory that stores a program, an execution halfway result of a program, and so forth. The CPU 52 is a central processing device that reads out a program from the main memory 51 and executes the program. The CPU 52 includes a chipset including a memory controller.

The LAN interface 53 is an interface for coupling the computer 50 to another computer via a LAN. The HDD 54 is a disk apparatus that stores programs and data and the super IO 55 is an interface for coupling input apparatuses such as mouse and keyboard. The DVI 56 is an interface to which a liquid crystal display apparatus is coupled and the ODD 57 is an apparatus that carries out reading and writing of a digital versatile disc (DVD).

The LAN interface 53 is coupled to the CPU 52 based on the PCI express (PCIe) and the HDD 54 and the ODD 57 are coupled to the CPU 52 based on the serial advanced technology attachment (SATA). The super IO 55 is coupled to the CPU 52 based on the low pin count (LPC).

Furthermore, the API management program executed in the computer 50 is stored in a DVD, which is one example of a recording medium readable by the computer 50, and is read out from the DVD by the ODD 57 to be installed on the computer 50. Alternatively, the API management program is stored in a database or the like of another computer system coupled through the LAN interface 53 and is read out from this database to be installed on the computer 50. Then, the installed API management program is stored in the HDD 54 and is read out to the main memory 51 to be executed by the CPU 52.

In the embodiment, description is made about the case in which the API is the Web API. However, the configuration of the present disclosure is not limited thereto and may be similarly applied also to an API other than the Web API.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system, comprising:
   a management apparatus that includes a first processor configured to:
      store, in a memory, first information on an access token indicating that a right to call an application programming interface exists and second information on the application programming interface, and
      execute, based on the first information and call capacity of the application programming interface included in the second information, an exchange for a different access token corresponding to the call capacity; and
   a client apparatus that includes a second processor configured to
      provide the application programming interface or use the application programming interface by utilizing the exchange for the different access token by the management apparatus, wherein
   the second processor is configured to:
      receive a use request of the application programming interface,
      determine whether the access token included in the received use request is the access token of the application programming interface, and
      request the management apparatus to execute an exchange for the access token of the application programming interface when it is determined that the access token included in the use request is not the access token of the application programming interface, and
   the first processor is configured to:
      determine whether call capability of the access token included in the use request and call capability of the access token of the application programming interface are equal based on a request from the client apparatus, and
      exchange the access token included in the use request for the access token of the application programming interface when it is determined that the call capability of the access token included in the use request and the call capability of the access token of the application programming interface are equal.

2. The information processing system according to claim 1, wherein
   the second processor is configured to:
      when accepting a use request of the application programming interface, determine whether the access token included in the use request is the access token of the application programming interface, and
      request the management apparatus to verify whether the access token included in the use request is correctly used when it is determined that the access token included in the use request is the access token of the application programming interface, and
   the first processor is configured to:
      verify whether the access token included in the use request is correctly used based on a request from the client apparatus, and
      make a response of a verification result to the client apparatus.

3. The information processing system according to claim 1, wherein
   the first processor is configured to
      when exchanging the access token included in the use request for the access token of the application programming interface, transmit a request for determining whether the exchange is possible to the client apparatus that provides the application programming interface, and
   the second processor is configured to:
      receive the request from the management apparatus, and
      execute the requested determination based on the access token included in the use request and an exchange track record of an owner of the access token.

4. The information processing system according to claim 1, wherein
   the first processor is configured to provide a basic access token that serves as a basis among the access tokens to the client apparatus, and
   the second processor is configured to use the application programming interface by using the basic access token.

5. An information processing method executed by an information processing system that includes a management apparatus and a client apparatus, the information processing method comprising:
   storing, in a memory, by a first processor included in the management apparatus, first information on an access token indicating that a right to call an application programming interface exists and second information on the application programming interface;
   executing, based on the first information and call capacity of the application programming interface included in the second information, an exchange for a different access token corresponding to the call capacity; and
   providing, by a second processor included in the client apparatus, the application programming interface or using the application programming interface by utilizing the exchange for the different access token by the management apparatus, wherein the method further comprises:

receiving, by the second processor, a use request of the application programming interface;

determining whether the access token included in the received use request is the access token of the application programming interface;

requesting the management apparatus to carry out an exchange for the access token of the application programming interface when it is determined that the access token included in the use request is not the access token of the application programming interface;

determining, by the first processor, whether call capability of the access token included in the use request and call capability of the access token of the application programming interface are equal based on a request from the client apparatus; and exchanging the access token included in the use request for the access token of the application programming interface when it is determined that the call capability of the access token included in the use request and the call capability of the access token of the application programming interface are equal.

6. The information processing method according to claim 5, further comprising:

receiving, by the second processor, a use request of the application programming interface;

determining whether the access token included in the received use request is the access token of the application programming interface;

requesting the management apparatus to verify whether the access token included in the use request is correctly used when it is determined that the access token included in the use request is the access token of the application programming interface;

verifying, by the first processor, whether the access token included in the use request is correctly used based on a request from the client apparatus; and making a response of a verification result to the client apparatus.

7. The information processing method according to claim 5, further comprising:

when exchanging the access token included in the use request for the access token of the application programming interface, transmitting, by the first processor, a request for determining whether the exchange is possible to the client apparatus that provides the application programming interface;

receiving, by the second processor, the request from the management apparatus; and executing the requested determination based on the access token included in the use request and an exchange track record of an owner of the access token.

8. The information processing method according to claim 5, further comprising:

providing, by the first processor, a basic access token that serves as a basis among the access tokens to the client apparatus, wherein the using the application programming interface includes using the basic access token.

* * * * *